Oct. 29, 1968 C. T. FLACHBARTH ET AL 3,408,094
FLOOR FITTINGS
Filed Aug. 12, 1965 2 Sheets-Sheet 1

Oct. 29, 1968   C. T. FLACHBARTH ET AL   3,408,094
FLOOR FITTINGS
Filed Aug. 12, 1965   2 Sheets-Sheet 2

United States Patent Office 3,408,094
Patented Oct. 29, 1968

3,408,094
FLOOR FITTINGS
Charles T. Flachbarth, Parkersburg, W. Va., and Robert Hadfield, Belpre, Ohio, assignors to Textron, Inc., Providence, R.I., a corporation of Rhode Island
Filed Aug. 12, 1965, Ser. No. 479,127
9 Claims. (Cl. 285—90)

This invention relates to improved floor fittings for under-floor electrical distribution systems and in particular relates to improvements in means for connecting a floor fitting to such a system.

The principal objective of the invention is to provide a floor fitting which is selectively positionable transversely and rotationally with respect to distributor entrance means and which is positively locked in any selected position.

More specifically, the invention relates to improvements in means for securing a floor fitting to distributor entrance means such as an insert, a floor tap, or the like, the invention providing for wide flexibility in selecting the position of the fitting with respect to the entrance means and providing that the fitting be secure against turning once it is disposed in the selected position.

Preferred embodiments of the invention will be described below in connection with the drawings wherein.

Figure 1:
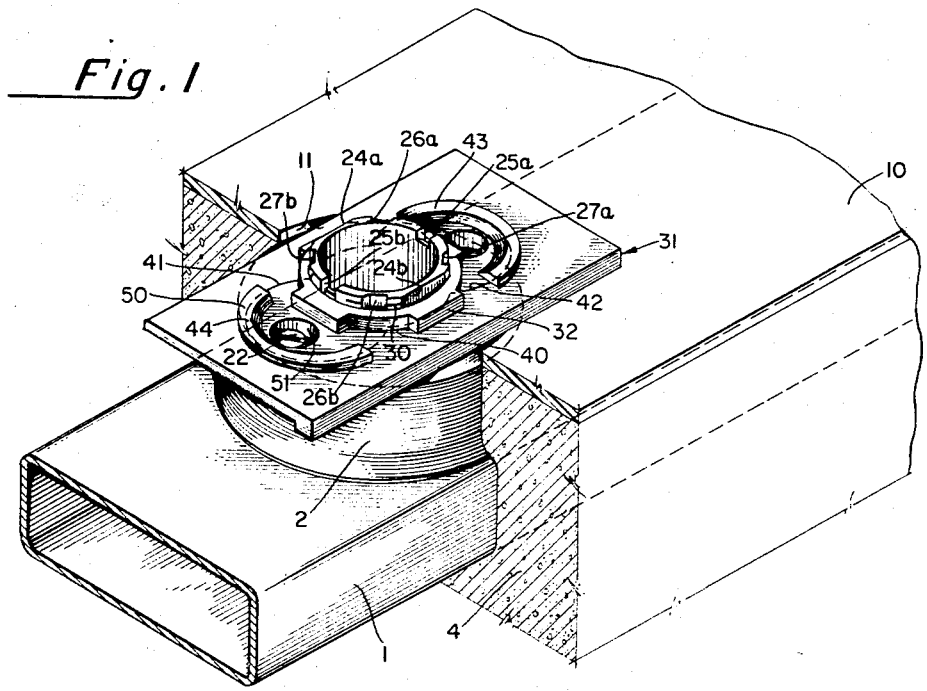
FIGURE 1 is a perspective view of an under-the-floor distribution duct having the present invention incorporated in the entrance means.
Figure 2:
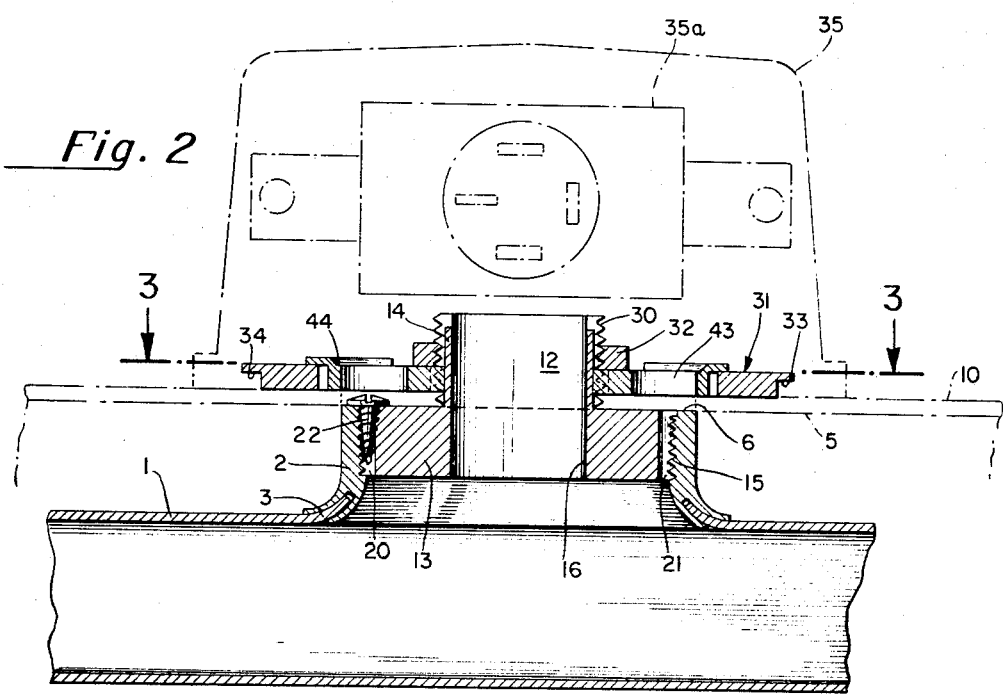
FIGURE 2 is a sectional view showing the various components of the invention arranged as indicated in FIGURE 1, the fitting housing and receptable being indicated in dot and dash lines.

In FIGURE 1, the duct 1 is part of an under-floor distribution system. The duct functions as a conductor distributor. Secured to the duct 1 is an entrance means in the form of an insert 2 which, as shown in FIGURE 2, is secured to the duct as by crimping indicated at 3. Electrical conductors in the duct are brought out via the insert 2. As shown, both the duct 1 and the insert 2 are buried in the concrete floor 4. The top surface 5 of the concrete is flush with the top surface 6 of the insert or the concrete surface 5 may be about ⅛″ above the insert surface 6. Linoleum or tile 10 is laid on the concrete and is provided with a circular opening indicated at 11.

Disposed within the insert 2 is a one-piece adapter 12 having a foot section 13 and an extension 14 which projects above the floor surface. The outer periphery of the foot section 13 has threads mating with threads on the inside of the insert, both of the threads being indicated at 15 in FIGURE 2. The adapter is provided with passage 16 to accommodate conductors from the duct 1. The outer periphery of the foot is provided with a pair of diametrically opposed slots 20 and 21. As shown the slot 20 has a locking screw 22. The locking screw bears against the adapter and also against the threads on the insert and firmly locks the adapter against movement or rotation in the insert.

The outer periphery of the extension has a pair of (FIGURE 1) diametrically opposed flats 24a and 24b and a plurality of pairs of axially extending slots, the pairs of slots being indicated at 25a–25b, 26a–26b and 27a–27b. As will be noted the corresponding slots of each pair are diametrically opposite one another and are respectively located in the areas intermediate the flats 24a and 24b.

The outer periphery of the extension 14 is also provided with threads 30 formed on the areas not occupied by the flats and slots.

Figure 3:
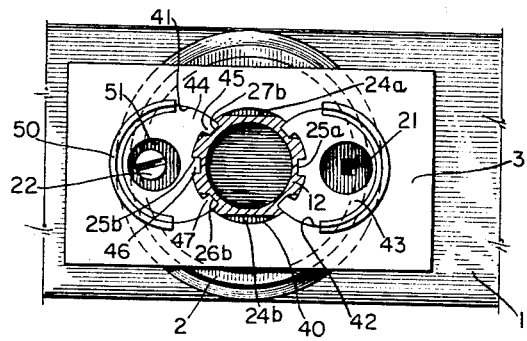
FIGURE 3 is a plan view taken along the line 3–3 of FIGURE 2 and illustrating in particular the position of components when the base is in or symmetrical with respect to the distributor entrance means.
Figure 4:
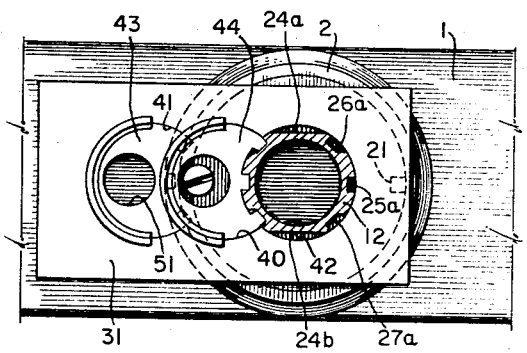
FIGURES 4 and 5 are views similar to that of FIGURE 3 and respectively illustrating positions of components when the base is off-set or shifted to the left or right side of the entrance means.
Figure 5:
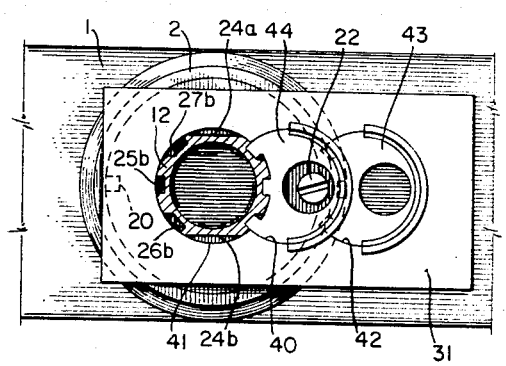

The flats and slots are configured so that the adapter can be die cast. This is brought about by configuring the flats and slots provided for draft. Thus it will be observed that the flats 23 and 24 are parallel to each other and the walls of the slots 25a and 25b are parallel to the flats. The inner walls of the slots 26a–26b, 27a–27b are all made parallel to the flats. In this way the dies can be parted in a direction left to right as viewed in FIGURE 2. The details of the adapter configuration are also shown in FIGURES 3, 4 and 5.

The construction of the adapter to provide for the same to be manufactured by die casting is important because it eliminates machining and minimizes handling and therefore makes considerable savings in manufacturing costs.

A base member 31 is fitted over the extension 14 and rests on top of the floor or tile 10. The base member is held down on the floor by the nut 32 which is fastened down on the threads 30.

The base 31 is provided with means for holding the floor fitting. In the particular embodiment shown the shoulders 33 and 34 on opposite sides of the base are of the kind shown in Patent 2,932,683 and cooperate with the fitting housing as explained in that patent to hold the same in place. In FIGURE 2 the fitting housing is indicated by dot and dash lines 35 and the receptacle in the housing as indicated by the dot and dash lines 35a.

The base 31 is provided with a plurality of intersecting openings or apertures which permit the base to be fitted on the extension 14. As best seen in FIGURE 3, the center aperture is indicated at 40 and the two outboard apertures are indicated at 41 and 42. These apertures are dimensioned so that the base will slide easily over the extension and the apertures are alternatively usable. In FIGURE 3 it will be noted that the center aperture 40 accommodates the extension 14 and the base is symmetrical with respect to the extension. In FIGURE 4 the right-hand aperture 42 accommodates the extension and in FIGURE 5 the left-hand aperture 41 accommodates the extension. In FIGURES 4 and 5 the base is shifted transversely or off-set with respect to the extension. Positioning the base as described, accordingly positions the fitting housing.

The apertures provide a highly desirable degree of flexibility in that the fitting housing can be centralized or shifted from one side or another with respect to the extension 14 or the distributor entrance means. Thus, where ducts are side-by-side in a distribution system and entrance means are closely adjacent, the fitting may be placed over each entrance means simply by using the left-hand aperture for one installation and the right-hand aperture for the other. So, too, the fitting can be shifted to accommodate furniture, machines or other like equipment.

As indicated above, the nut 32 holds the base down on the floor. Experience has shown that a nut or nipple acting against a fitting base cannot be relied upon to prevent turning of the base. For example, in many instances the fitting housing is exposed to relatively severe contacts which tends to rotate the housing and base and thus loosen the nut. Once the nut is loose the fitting is susceptible to turning even with light contacts. Frequent turning of the fitting can be hazardous, particularly from the standpoint of causing loose connections or severing conductor insulation and thereby exposing personnel to the danger of shock.

We have provided means which will lock and thus eliminate any turning of the fitting while at the same time augment the highly desirable flexibility characteristic of the fitting as explained above.

In general, locking is accomplished by providing the extension with slots and causing a lug to interengage between a slot and the base and thereby prevent the base from turning relative to the adapter.

In the embodiment of FIGURE 1 locking is accomplished by means of the slots and flats on the extension 14, which cooperate with locking plugs adapted to occupy one or more of the base apertures not occupied by the extension. The locking plugs have anti-turning lugs. In FIGURES 1, 2 and 3 we have indicated the locking plugs at 43 and 44.

The locking plugs are identical in construction and only the locking plug 44 will be described in detail. Referring to FIGURE 3, the plug 44 occupies the aperture 41, is circular and has lugs 45, 46 and 47 respectively engaging the slots 27b, 25b, and 26b in the extension. In addition, the plug is dimensioned so that it fits relatively snugly and engages the wall of the aperture 41. With the foregoing construction, turning of the base with respect to the extension is impossible.

When the transverse position of the fitting has been selected, the base is slipped over the extension using the appropriate aperture 40, 41 or 42. Then the base is shifted or rotated to the desired rotational position and the locking plug dropped into place.

The arrangement of slots and lugs while providing a positive lock enhances the positioning flexibility of the fitting. It will be noted that in the arrangement shown, the slots and flats on the extension and the lugs on the locking plugs provide for eight different rotational positions. In any rotational position the base or fitting can occupy different transverse positions.

Figure 6:
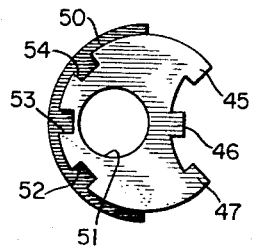
FIGURE 6 is an enlarged view of a locking plug used in the embodiment illustrated in FIGURE 1.

It is to be observed that the locking plug is provided with a shoulder 50 (FIGURES 6 and 1) which overlaps and engages the top surface of the base. The purpose of the shoulder is to prevent the locking plug from falling through the aperture in those instances where the linoleum or tile does not extend inwardly far enough to provide some support.

The locking plug 44 is also formed with an opening 51 which, as shown, provides an access to the locking screw 22. This opening serves the important function of providing a passageway for a grounding conductor to be fastened down by the locking screw.

In instances where the base is shifted toward the left or toward the right (as shown in FIGURES 4 and 5) the locking plugs occupy the appropriate apertures as shown. Thus in FIGURE 4 the locking plugs occupy the apertures 40 and 41 and in FIGURE 5 occupy the apertures 40 and 42. Both the locking plug and the extension 14 are symmetrical and the apertures are of the same size to provide for interchange of the plugs with the apertures; compare the location of parts in FIGURES 4 and 5.

In the outboard or off-set positions of FIGURES 4 and 5 it is necessary to accommodate the lugs of the outboard locking plug. Thus it will be seen (FIGURE 6) that the plug is undercut at 52, 53 and 54.

In connection with the above it should be observed that the flats 24a and 24b also function as slots in preventing turning. For example, if in FIGURE 3 the base is turned say clockwise 45°, the lug 45 will engage the flat 24a. If the base is turned another 45°, the lug 46 will engage the flat 24a, and so on.

From the foregoing it will be apparent that we have provided an arrangement for locking the fitting in its desired position while at the same time providing a great deal of flexibility in selecting fitting position. This, of course, is of great advantage from both the installer's and the user's standpoint. Floor obstructions which might otherwise necessitate removal or replacement can usually be accommodated by shifting the fitting transversely or rotationally. In many instances this enables a grtat savings in time and money. Furthermore, from the user's standpoint the flexibility is of considerable advantage because the fitting whether it be a common receptacle or some communications outlet can be oriented as is most convenient and desirable for the user's conditions.

Figure 7:
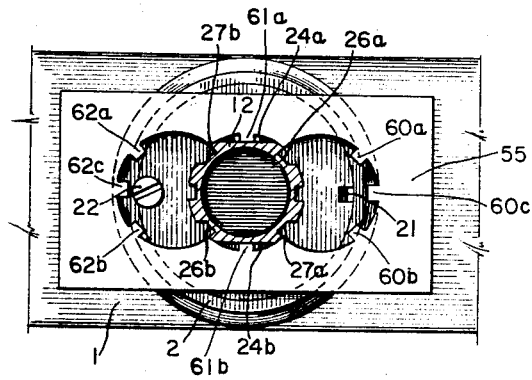
FIGURE 7 is a plan view (with certain parts removed) of another embodiment of the invention.
Figure 8:
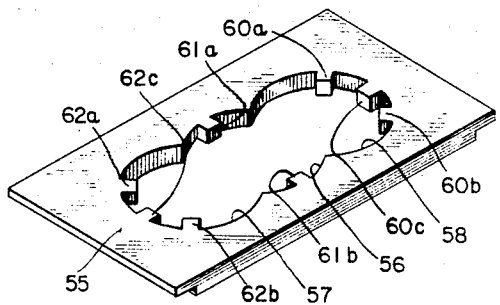
FIGURE 8 is a perspective view of the base member of the embodiment of FIGURE 7.

In FIGURES 7 and 8, we have shown a modification of the invention. In this modification, the extension is of the same construction as described above but the locking plugs are eliminated and the base is provided with especially located lugs.

Thus it will be seen that the base 55 has a plurality of intersecting apertures 56, 57 and 58. These apertures are the same as the apertures 40, 41 and 42 of FIGURE 3. The right-hand aperture 58 has three lugs 60a, 60b and 60c. The center aperture 56 has a pair of diametrically opposed lugs 61a and 61b. The left hand aperture 57 has three lugs 62a, 62b and 62c.

With the arrangement of lugs and slots as shown, the base can be oriented at eight different rotational positions with respect to the extension. For example, one position is shown in FIGURE 7 where the lugs 61a and 61b cooperate with the flats 24a and 24b. If the base is rotated (by removing and replacing) say 45° clockwise, the lug 61a cooperates with the slot 26a, and the lug 61b cooperates with the slot 26b. If the base is positioned another 45° clockwise, the lug 61a cooperates with the slot 25a, and the lug 61b with the slot 25b and so on for the eight different positions. In any radial or rotational position, the base can be positioned transversely by selecting the apertures 56, 57 or 58 to cooperate with the extension.

The embodiment for FIGURE 8 attains to the same advantages as the embodiment of FIGURE 1, etc. That is, there is a great flexibility both in transverse and rotational positions of the fitting with respect to the distributor entrance means and in any of the selected positions the fitting can be positively locked.

We claim:

1. In an under floor distribution system, mechanism for attaching a floor fitting to conductor-distributor entrance means;

an adapter disposed in said entrance means and having an extension projecting above the surface of the floor, the outer periphery of the extension having a pair of diametrically opposed axially extending flats and a plurality of pairs of axially extending slots, corresponding slots of each pair being diametrically opposite one another and respectively located in the areas intermediate the flats and the slots, the sides of said slots and said flats being oriented to provide for draft and the extension having threads formed on peripheral areas not occupied by said flats and said slots;

mechanism on said entrance means and on said adapter fixing the adapter against movement in the entrance means;

a base member disposed over said extension and engaging the floor surface, the base being formed with a plurality of side-by-side apertures alternatively usable to accommodate the extension and one of the apertures having the extension protruding therethrough;

a locking plug in the aperture adjacent said one aperture, the locking plug having lugs respectively engaging slots in said extension and the plug also engaging the wall of its aperture, said locking plug and base member provided with cooperating means thereon to prevent said plug from passing through said aperture from one side thereof, and cooperating means between said plug, member and extension to prevent rotation of said plug relative to said plate and adapter extension whereby, the locking plug prevents the base from turning about the extension;

nut means on said extension threads and holding said base against said surface and for holding said plug in said aperture; and means on said base for holding a fitting housing.

2. In an under floor distribution system, mechanism for attaching a floor fitting to conductor-distributor entrance means;

an adapter disposed in said entrance means and having an extension projecting above the surface of the floor, the outer periphery of the extension having a pair of diametrically opposed axially extending flats and a plurality of pairs of axially extending slots, corresponding slots of each pair being diametrically opposite one another and respectively located in the areas intermediate the flats and the slots, the sides of said slots and said flats being oriented to provide for draft and the extension having threads formed on peripheral areas not occupied by said flats and said slots;

mechanism on said entrance means and on said adapter fixing the adapter against movement in the entrance means;

a base member disposed over said extension and engaging the floor surface, the base being formed with a plurality of side-by-side apertures alternatively usable to accommodate the extension and one of the apertures having the extension protruding therethrough;

means in said one aperture and connected between said base and said grooves on said extension in one position of said base member relative to said extension and between said slots on said extension in a second position of said base member relative to said extension and between said slots and grooves on said extension in a third position of said base member relative to said extension to prevent the base from turning about the extension;

nut means on said extension threads and holding said base against said surface; and means on said base for holding a fitting housing.

3. In an under floor distribution system, mechanism for attaching a floor fitting to a conductor-distributor insert, the insert being of the type having internal threads;

an adapted having a foot with threads on the periphery of the foot mating with the threads in said insert and a slot on the periphery of said foot, the adapter also having an extension connected to the foot and projecting above the surface of the floor, the outer periphery of the extension having a pair of diametrically opposed axially extending flats and a plurality of pairs of axially extending slots, corresponding slots of each pair being diametrically opposite one another and respectively located in the areas intermediate the flats and the slots, the sides of said slots being oriented to provide for draft and the extension having threads formed on peripheral areas not occupied by said flats and said slots;

a locking screw in said foot slot engaging the insert threads and fixing the adapter against movement in the insert;

a base member disposed over said extension and engaging the floor surface, the base being formed with a plurality of side-by-side apertures alternatively usable to accommodate the extension and one of the apertures having the extension protruding therethrough;

a locking plug in the aperture adjacent said one aperture, the locking plug having lugs respectively engaging slots in said extension and the plug also engaging the wall of its aperture, said locking plug and base member provided with cooperating means thereon to prevent said plug from passing through said aperture from one side thereof, and cooperating means between said plug, member and extension to prevent rotation of said plug relative to said plate and adapter extension whereby, the locking plug prevents the base from turning about the extension;

nut means on said extension threads and holding said base against said surface and for holding said plug in said aperture; and means on said base for holding a fitting housing.

4. In an under floor distribution system, mechanism for attaching a floor fitting to conductor-distributor entrance means;

an adapter disposed in said entrance means and having an extension protruding above the surface of the floor, the outer periphery of the extension having a plurality of slots disposed therearound and further having threads on areas interjacent the slots;

means on said entrance means and on said adapter fixing the adapter against movement in the entrance means;

a base member disposed over said extension and engaging the floor surface, the base being formed with a plurality of side-by-side apertures alternatively usable to accommodate the extension and one of the apertures having the extension protruding therethrough;

mechanism operatively connected between said base and at least one of said slots to prevent the base from turning about the extension, said apertures, said slots and said mechanism providing for the base to be placed on said extension so that the same is oriented in any one of a plurality of radial positions with respect to the extension and said apertures providing for the base when in any of said radial positions to be symmetrical or off-set with respect to the extension;

nut means on said extension threads and holding said base against said surface; and means on said base for holding a fitting housing.

5. In an under floor distribution system, mechanism for attaching a floor fitting to conductor-distributor entrance means;

an adapter disposed in said entrance means and having an extension protruding above the surface of the floor, the outer periphery of the extension having a plurality of pairs of slots respectively diametrically opposite one another and further having threads on areas interjacent the slots;

mechanism on said entrance means and on said adapter fixing the adapter against movement in the entrance means;

a base member disposed over said extension and engaging the floor surface, the base being formed with a plurality of side-by-side apertures alternatively usable to accommodate the extension and one of the apertures having an extension protruding therethrough;

a locking plug in the aperture adjacent said one aperture, the locking plug having lugs respectively engaging slots in said extension and the plug also engaging the wall of its aperture, said locking plug and base member provided with cooperating means thereon to prevent said plug from passing through said aperture from one side thereof, and cooperating means between said plug, member and extension to prevent rotation of said plug relative to said plate and adapter extension whereby, the locking plug prevents the base from turning about the extension;

nut means on said extension threads and holding said base against said surface and for holding said plug in said aperture; and means on said base for holding a fitting housing.

6. In an under floor distribution system, mechanism for attaching a floor fitting to conductor-distributor insert, the insert being of the type having internal threads;

an adapter having a foot with threads on the periphery of the foot mating with the threads in said insert and a slot on the periphery of said foot, the adapter also having an extension connected to the foot and projecting above the floor surface, the outer periphery of the extension having a plurality of pairs of slots, the corresponding pairs of slots each being diametrically opposite one another and further having threads on areas interjacent the slots;

a locking screw in said foot slot engaging the insert threads and fixing the adapter against movement in the insert;

a base member disposed over said extension and engaging the floor surface, the base being formed with a plurality of side-by-side apertures alternatively usable to accommodate the extension, and one of the apertures having the extension protruding therethrough;

a locking plug in the aperture adjacent said one aperture, the locking plug having an aperture providing grounding connection access to said locking screw and also having a plurality of lugs respectively engaging slots in said extension and the plug also engaging the wall of its aperture, said locking plug and base member provided with cooperating means thereon to prevent said plug from passing through said aperture from one side thereof, and cooperating means between said plug, member and extension to prevent rotation of said plug relative to said plate and adapter extension whereby, the locking plug prevents the base from turning about the extension;

nut means on said extension threads and holding said base against said floor surface and for holding said plug in said aperture; and means on said base for holding a fitting housing.

7. In an under floor distribution system, mechanism for attaching a floor fitting to a conductor-distributor insert, the insert being of the type having internal threads;

an adapter having a foot with threads on the periphery of the foot mating with threads in said insert and a slot on the periphery of said foot, the adapter also having an extension connected to the foot and projecting above the floor surface, the outer periphery of the extension having a plurality of pairs of slots, the corresponding pairs of slots each being diametrically opposite one another and further having threads on the area not occupied by the slots;

a locking screw in said foot slot engaging the insert threads and fixing the adapter against movement in the insert;

a base member disposed over said extension and engaging the floor surface, the base being formed with a plurality of side-by-side apertures alternatively usable to accommodate the extension and one of the apertures having the extension protruding therethrough;

a locking plug in the aperture adjacent said one aperture, the locking plug having lugs respectviely engaging slots in said extension and the plug also engaging the wall of its aperture, said locking plug and base member provided with cooperating means thereon to prevent said plug from passing through said aperture from one side thereof, and cooperating means between said plug, member and extension to prevent rotation of said plug relative to said plate and adapter extension whereby, the locking plug prevents the base from turning about the extension;

nut means on said extension threads and holding said base against said surface and for holding said plug in said aperture; and means on said base for holding a fitting housing.

8. In an under floor distribution system, mechanism for attaching a floor fitting to conductor-distributor entrance means;

an adapter disposed in said entrance means and having an extension projecting above the surface of the floor, the outer periphery of the extension having a pair of diametrically opposed axially extending flats and a plurality of pairs of axially extending slots, corresponding slots of each pair being diametrically opposite one another and respectively located in the areas intermediate the flats and the slots, the sides of said slots and said flats being oriented to provide for draft and the extension having threads formed on peripheral areas not occupied by said flats and said slots;

a base member disposed over said extension and engaging the floor surface, the base having a pair of intersecting apertures alternatively usable to accommodate the extension and one of the apertures having the extension protruding therethrough;

a pair of lugs on said base projecting into said one aperture, the lugs being diametrically opposite one another and the lugs engaging slots in one position of said base member relative to said adapter and engaging said flats in a second position of said base member relative to said adapter and engaging said flats and slots in a third position of said base member relative to said adapter in said extension; and a plurality of lugs on said base and projecting into the other of said apertures for engaging the slots in one position of said base member relative to said adapter and engaging said flats in a second position of said base member relative to said adapter and engaging said flats and slots in a third position of said base member relative to said adapter when the extension is protruding therethrough and means on said extension, cooperating with said threads, holding said base member against said surface.

9. In an under floor distribution system, mechanism for attaching a floor fitting to conductor-distributor entrance means;

an adapter disposed in said entrance means and having an extension projecting above the surface of the floor, the outer periphery of the extension having a plurality of axial extending slots and flats disposed therearound and further having threads formed on peripheral areas not occupied by said flats and said slots;

a base member disposed over said extension and engaging the floor surface, the base having a pair of intersecting apertures alternatively usable to accommodate the extension and one of the apertures having the extension protruding therethrough;

a pair of lugs on said base projecting into said one aperture, the lugs being diametrically opposite one another and the lugs engaging slots in one position of said base member relative to said adapter and enging said flats in a second position of said base member relative to said adapter and engaging said flats and slots in a third position of said base member relative to said adapter in said extension; and a plurality of lugs on said base and projecting into the other of said apertures for engaging the slots in one position of said base member relative to said adapter and engaging said flats in a second position of said base member relative to said adapter and engaging said flats and slots in a third position of said base member relative to said adapter when the extension is protruding therethrough and means on said extension, cooperating with said threads, holding said base member against said surface.

References Cited

UNITED STATES PATENTS

| | | | |
|---|---|---|---|
| 699,215 | 5/1902 | Muller | 220—3.7 |
| 791,891 | 6/1905 | Fletcher | 151—45 |
| 1,809,864 | 6/1931 | Pearson | 285—203 X |
| 2,008,096 | 7/1935 | Clo | 285—330 |
| 2,053,943 | 9/1936 | Carlson | 285—177 X |
| 2,322,213 | 6/1943 | Amberg | 285—177 X |
| 2,842,384 | 7/1958 | Foskett | 285—158 X |
| 2,950,837 | 8/1960 | Christensen et al. | 220—3.7 |
| 3,047,650 | 7/1962 | Reiland | 52—221 |
| 3,195,561 | 6/1965 | Sovitzky | 285—158 X |
| 3,236,545 | 2/1966 | Parkes et al. | 285—394 X |

FOREIGN PATENTS 231,039   3/1925   Great Britain.

EDWARD C. ALLEN, *Primary Examiner.*

D. W. AROLA, *Assistant Examiner.*